Oct. 18, 1932.   F. H. RAGAN   1,883,316
BRAKE MECHANISM
Filed June 16, 1928
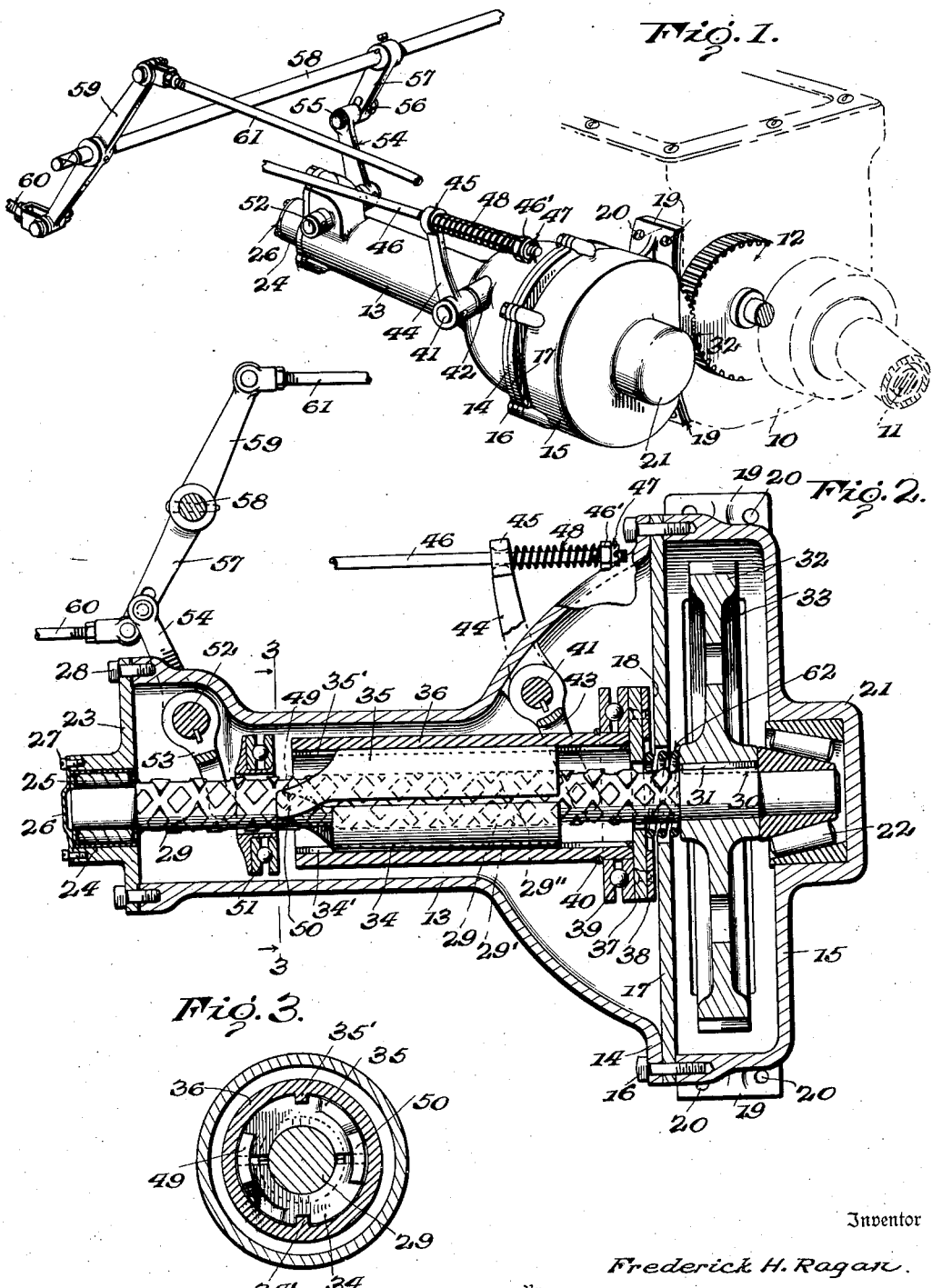
Inventor
Frederick H. Ragan.
By Cameron Kirkam & Sutton
Attorneys Patented Oct. 18, 1932

1,883,316

UNITED STATES PATENT OFFICE

FREDERICK HATHAWAY RAGAN, OF CLEVELAND, OHIO

BRAKE MECHANISM

Application filed June 16, 1928. Serial No. 285,962.

This invention relates to brake operating mechanism for automobiles, and more particularly to a power operating mechanism therefor.

Power operated brake mechanism heretofore known in the art have been large and cumbersome devices, expensive to build and subject to rapid wear. Moreover, the controlling connection for the operating mechanism has been called upon to transmit the full brake applying force so that accurate control of the braking effect has been difficult if not impossible to secure, and the frictional transmission members have rapidly burned out.

One object of the invention therefore is to provide a power brake operating mechanism which is simple in construction, durable and efficient in operation and which is at all times under the control of the operator.

Another object is to provide such a device in which the force required to control the application of the brakes is a small fraction of the brake applying force.

Another object is to provide such a device in which a force multiplying unit is interposed between the driving member and the brake operating member.

Another object is to provide a power brake operating mechanism which operates equally well whether the vehicle is going forward or backward.

Another object of the invention is the provision of a power brake operating mechanism including a force multiplying unit under the control of the operator, the controlling means being outside the line of transmission of force.

Other objects and advantages of this invention will be apparent from the following description taken in connection with the disclosure in the accompanying drawing.

The invention is capable of receiving a variety of mechanical expressions, one of which is shown in the accompanying drawing. It is to be understood, therefore, that the disclosure is illustrative only, and the scope of the invention is defined by the claims appended hereto.

In the drawing:

Fig. 1 is a perspective view of the device showing it in operative relation to the transmission and brake operating mechanism of the vehicle.

Fig. 2 is a vertical longitudinal section of the power unit, and

Fig. 3 is a vertical transverse sectional view taken approximately on the line 3—3 of Fig. 2.

Referring first to Fig. 1 of the drawing, numeral 10 indicates the usual change speed transmission casing of an automobile with a drive shaft 11 extending rearwardly therefrom and having a gear 12 therein fixedly mounted on an extension of the drive shaft 11 and rotating therewith.

The power unit comprises a housing 13 of generally cylindrical shape having a bell-shaped enlargement at its rear end terminating in a radial flange 14. A cup-shaped casing member 15 is attached to the flange 14 in any suitable manner as by means of the cap screws 16, a flat plate 17 being interposed between the flange 14 and the casing member 15 and having a central aperture surrounded by a frictional surface 18 for a purpose which will later appear.

The casing member 15 is provided with an integral bracket 19 adapted to be attached to the sides of the transmission gear casing by cap screws 20 or other suitable means, and is further provided with a central boss 21 forming a seat for a radial and thrust anti-friction bearing 22 located therein. The forward end of the housing 13 is closed by a cap plate 23 provided with a boss 24 forming a seat for a radial anti-friction bearing 25 held in place by a cover plate 26. The plate 26 is held to the cap 23 and cap 23 is fixed to housing 13 by any suitable means such as cap screws 27 and 28 respectively.

A shaft 29 is mounted within the housing 13 and extends through the opening in the fixed plate 17, and has its ends reduced and mounted in the bearings 22 and 25 respectively. The shaft 29 is provided with two sets of reversely inclined threads 29' and 29'' throughout the major portion of its length, and has a smooth portion near its rear end provided with a key way 30. A gear 32 is mounted on the smooth portion of the shaft and is keyed thereto by suitable means such as a key 31. This gear 32 extends through an opening 33 in the side of the casing member 15, and through a registering opening in the transmission gear casing and constantly meshes with the gear 12 which is in driving relation with the drive shaft 11.

Two oppositely threaded half nut members 34 and 35 are mounted upon the threaded portion of shaft 29 one cooperating with thread 29' and the other with thread 29". A sleeve 36 is slidably keyed on the nut members by suitable means such as splines 34' and 35' so that the nut members may move longitudinally relative to each other and to the sleeve, while the assembly of the nut members and sleeve rotates together as a unit at all times. The rear end of sleeve 36 has welded or otherwise fixed thereto a plate 37 provided with a friction facing 38 adapted to engage the friction surface 18 of the plate 17. An antifriction thrust bearing 39 is held in contact with the plate 37 by any suitable means such as a split ring 40 lodged in a depression in the outer surface of sleeve 36. A cross shaft 41 extends through the housing 13 in a suitable bearing 42, and has keyed thereon a yoke 43 the ends of which are adapted to engage the thrust bearing 39 when the yoke is swung in a counterclockwise direction. The shaft 41 extends outside the housing 13 and has pinned or otherwise fixed thereon an operating arm 44 terminating in an eye 45. A drag link 46 extends rearwardly from the brake pedal of the vehicle, not shown, through the eye 45 of arm 44 and carries an adjustable stop such as a nut 46' threaded thereon and locked by a cotter pin 47. Interposed between the eye 45 and the nut 46' is a compression spring 48 arranged so that forward motion of the drag link 46 will cause the arm 44 to be yieldingly swung in a counterclockwise direction.

The forward ends of the nut members 34 and 35 are provided with abutments 49 and 50 respectively on opposite sides of the screw shaft 29, and are adapted to engage a thrust bearing 51 loosely mounted on shaft 29. A cross shaft 52 extends through the forward end of housing 13 above shaft 29, and carries keyed thereon a yoke member 53 the ends of which engage the thrust bearing 51 on the opposite side to the abutments 49 and 50. The cross shaft 52 extends outside the housing 13 and has fixed thereon an arm 54 which is in operative engagement as by means of a pin and slot connection 55, and 56 with an arm 57 fixed on the usual brake operating shaft 58 of the vehicle. The shaft 58 is mounted as usual in the side frame members of the vehicle, not shown, and carries the usual operating levers 59, one of which is shown, connected to the drag links 60 and 61 for operating the front and rear wheel brakes of the vehicle respectively.

The operation of the device is as follows:

When the vehicle is in motion the gears 12 and 32, shaft 29, nut members 34 and 35, and sleeve 36, all rotate freely together. If, however, pressure be applied to the brake pedal of the vehicle, the drag link 46 will swing shaft 41 counterclockwise causing the yoke 43 to bear against the thrust bearing 39 moving sleeve 36 rearwardly and causing frictional engagement to take place between the friction face 38 and the friction surface 18 on the fixed plate 17. This frictional engagement causes the rotation of sleeve 36 to be restrained, which restrains the rotation of nut members 34 and 35 and causes them to move longitudinally along the shaft 29 in opposite directions. That one of the nut members which moves forwardly, depending on the direction of rotation of shaft 29, abuts the thrust bearing 51 and forces it in a forward direction thus swinging the yoke 53 which rests against the thrust bearing 51, and rotating the shaft 52 in a clockwise direction. This rotation is transmitted by means of the arms 54 and 57 to the brake shaft 58, thus rotating the shaft 58 and applying the vehicle brakes in the usual manner. When the pressure on the brake pedal of the vehicle is released, the braking member 38 is withdrawn from the friction surface 18 in any suitable manner, as by spring 62. The usual brake releasing springs, not shown, will then swing the shaft 52 back to its normal position causing the thrust bearing 51 to rotate the active nut member to its original position on shaft 29. The rotation of the sleeve 36 caused by the backward motion of the active nut member will rotate the inactive nut member and return the same to its normal position.

It will be seen that there is here provided a power brake operating mechanism including a force multiplying device which gives a high mechanical advantage to the driving gear 32 over the brake operating mechanism of the vehicle. Furthermore, the controlling device, in this case the clutch 38, 18, is outside the line of transmission of power and can therefore be made small and light and susceptible to easy and accurate regulation.

An especial advantage of the method of controlling the nut members 34 and 35 disclosed in the present embodiment of the invention is that the active member, that is the nut member which moves forwardly to operate the brake mechanism, has a tendency to drag with it the splined sleeve 36 by reason of the frictional engagement between the nut and sleeve. This friction is substantially proportional to the thrust being exerted by the nut member on the brake operating mechanism and since it acts in opposition to the force that creates the pressure between the friction members 38 and 18, it tends to relieve any "grabbing" action of these clutch surfaces and renders the action of this device exceptionally smooth and even. Moreover, since this relieving effect is transmitted to the operator through the connections to the brake pedal, and must be overcome by him as he secures the desired braking effect, it automatically indicates to him the exact braking effect applied to the vehicle brakes, regardless of the condition of the friction surfaces 38 and 18. In other words, the operator is enabled to feel the operation of the brakes exactly as in the ordinary manual braking system, although the force exerted by the operator is multiplied by a constant factor of any desired magnitude depending upon the design of the parts of the brake unit.

While, for the sake of clearness, one expression of the inventive idea has been shown and described in detail, it is to be understood that other embodiments are possible within the scope of the invention, and it is to be understood that the present disclosure is to be considered as illustrative only and not as limiting the invention further than as defined in the appended claims.

What is claimed is:

1. A brake operating mechanism including a screw member and a pair of nut members threaded thereon, means for rotating the screw member, means for restraining the rotation of the nut members to thereby cause translation thereof, and connections between the nut members and the brakes whereby translation of the nut members in one direction will operate the brakes.

2. A brake operating mechanism including a driving member and a pair of driven members normally rotating in unison, means whereby relative rotation between the driving and driven members will cause translation of the driven members in opposite directions, connections between the driven members and the brakes including thrust elements whereby translation of the driven members in one direction will operate the brakes, and manually controlled means for restraining the rotation of the driven members.

3. A brake operating mechanism including a driving member, a driven member threaded thereon and normally rotating therewith, a control member mounted on the driven member for longitudinal movement thereof and rotary movement therewith, means under the control of the operator for restraining rotation of the control member, and means whereby longitudinal movement of the driven member will operate the brakes.

4. In a brake operating mechanism, a force multiplying unit including reversely threaded screw and nut elements driven from a rotating part, means continuously under the control of the operator for restraining the rotation of certain of said driven elements in order to cause longitudinal movement thereof in opposite directions, and connections between the restrained members and the brakes whereby movement of the restrained members in one direction will apply the brakes.

5. In a brake operating mechanism for vehicles and the like, a power unit including a reversely threaded shaft driven from a rotating part of the vehicle, a pair of reversely threaded nuts mounted on and rotatable with the shaft, means under the control of the operator for causing longitudinal motion of the nuts in opposite directions by restraining their rotation, and connections between the nuts and brakes whereby longitudinal motion of the nuts in one direction will apply the brakes.

6. A brake operating mechanism including a threaded driving shaft continuously driven from a rotating part, a nut member threaded on the shaft and normally rotating therewith, a sleeve mounted on the nut member for rotation therewith and longitudinal movement thereof and having a friction disk fixed thereon, a stationary friction disk mounted adjacent said first disk, means for moving the sleeve longitudinally to bring the friction disks into engagement to restrain the rotation of the sleeve and nut, and connections between the nut and brakes whereby longitudinal movement of the nut will apply the brakes.

7. A brake operating mechanism including a reversely threaded driving shaft continuously driven from a rotating part, a pair of reversely threaded nut members threaded on the shaft and normally rotating therewith, a sleeve mounted on the nut members for rotation therewith and longitudinal movement thereof and having a friction disk fixed thereon, a stationary friction disk mounted adjacent said first disk, means normally maintaining the disks out of contact with each other, means for moving the sleeve longitudinally to bring the friction disks into contact to restrain the rotation of the sleeve and nuts, and connections between the nuts and the brakes whereby longitudinal movement of the nuts in one direction will apply the brakes.

8. A brake operating mechanism including a threaded shaft continuously driven from a rotating part, a nut member threaded on the shaft and normally rotating therewith, said nut member having an abutment at one end, a thrust bearing freely mounted on the shaft and co-operating with said abutment, manually controlled means for causing longitudinal movement of the nut member by restraining its rotation, a thrust bearing for preventing longitudinal movement of the shaft, and connections between the first mentioned thrust bearing and the brakes whereby longitudinal movement of said first thrust bearing will apply the brakes.

9. A brake operating mechanism including a reversely threaded shaft continuously driven from a rotating part, a pair of reversely threaded nut members threaded on the shaft and normally rotating therewith, said nut members each having an abutment at one end, a thrust bearing freely mounted on the shaft and adapted to cooperate with said abutments, means under the control of the operator for causing longitudinal movement of the nut members in opposite directions by restraining their rotation, a thrust bearing for preventing longitudinal movement of the shaft in one direction, and connections between the first mentioned thrust bearing and the brakes whereby longitudinal movement of said first thrust bearing by a nut member will apply the brakes.

In testimony whereof I have signed this specification.

FREDERICK H. RAGAN.